United States Patent [19]
Hohenberg et al.

[11] 3,829,666
[45] Aug. 13, 1974

[54] CIRCUIT FOR AUTOMATIC REFERRING OF GAS TURBINE PERFORMANCE PARAMETERS

[75] Inventors: Rudolph Hohenberg, Trumbull; Alan R. Duly, Huntington, both of Conn.

[73] Assignee: Avco Corporation, Stratford, Conn.

[22] Filed: June 26, 1973

[21] Appl. No.: 373,699

[52] U.S. Cl. ............................... 235/151.3, 73/116
[51] Int. Cl. ........................... G06g 7/70, G011 5/13
[58] Field of Search ........... 235/151.3, 150.2, 150.3, 235/150.26; 73/116, 117.2, 117.3, 117.4

[56] References Cited
UNITED STATES PATENTS

| | | | |
|---|---|---|---|
| 3,538,760 | 11/1970 | Atkey et al. | 73/117.4 |
| 3,666,929 | 5/1972 | Menn | 235/150.26 X |
| 3,697,731 | 10/1972 | Kempema et al. | 235/150.2 |
| 3,750,465 | 8/1973 | Howell et al. | 235/150.2 X |

Primary Examiner—Joseph F. Ruggiero
Attorney, Agent, or Firm—Charles M. Hogan; Irwin P. Garfinkle

[57] ABSTRACT

A signal having a frequency proportional to a parameter (power, speed or fuel flow) of a gas turbine engine is "referred" by first developing a square wave of uniform height and width independent of signal magnitude, but having a pulse repetition rate equal to the signal frequency. The area of the square wave is then varied as a function of pressure and temperature to obtain the "referred" parameter in accordance with the transfer function $1/\lambda \sqrt{\theta}$,
where:
$\lambda = P/29.92$ in. Hg.;
$\theta = 460 + T_A/518.4$
P = ambient pressure; and
$T_A$ = ambient temperature

13 Claims, 3 Drawing Figures

CIRCUIT FOR AUTOMATIC REFERRING OF GAS TURBINE PERFORMANCE PARAMETERS

BACKGROUND OF THE INVENTION

The concept of "referring" engine parameters is known in the prior art, one such arrangement being shown in Hohenberg's U.S. Pat. No. 3,736,796 issued June 5, 1973. This invention provides a particular circuit arrangement for referring engine parameters.

The transfer functions in referring engine parameters and $\lambda$ and $\theta$, where:

$\lambda$ = Sensed total ambient pressure/Standard sea level pressure = $P_a/29.92$ in. Hg.

and $\theta = 460 + T_A/518.4$, where $T_A$ is total ambient temperature °R.

This invention provides a circuit which solves the required transfer function and is capable of referring such engine parameters as power, fuel flow and speed, the equations for which are:

Referred Power = $P/\lambda \sqrt{\theta}$, where P is actual power

Referred Fuel Flow = $W_f/\lambda \sqrt{\theta}$, where $W_f$ is actual fuel flow Referred Speed = $N/\sqrt{\theta}$, where N is actual speed

SUMMARY OF THE INVENTION

In summary, this invention develops a voltage having a pulse repetition rate proportional to the parameter being referred. The system then provides a square wave pulse having a height and duty cycle which are variable in accordance with the transfer functions of $1/\lambda$, $1/\theta$, $1/\theta n$ and $1/\lambda \sqrt{\theta}$. The output is proportional to the referred parameter, i.e., power, fuel flow or speed.

THE DRAWINGS

DESCRIPTION OF THE ILLUSTRATED EMBODIMENT

The invention assumes the generation of an input signal having a frequency proportional to an engine parameter to be referred. The aforesaid Hohenberg patent disclosed an arrangement for referring engine speed, and the input signal was generated by a magnetic pickup or other conventional speed-sensing mechanism. Other engine parameters, such as power or fuel flow, may be similarly generated, or could be generated by converting a voltage magnitude to a frequency. Such systems are conventional in the prior art and are not described here.

Figure 2:
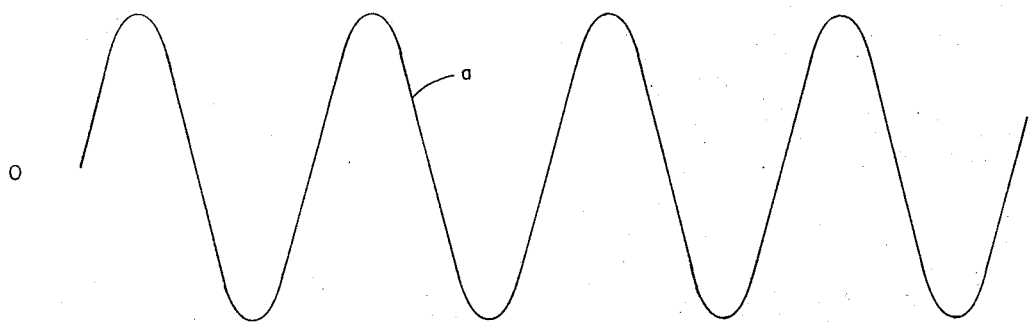
Figure 2:
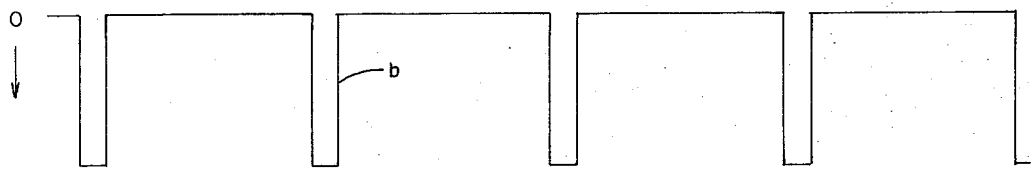
Figure 2:
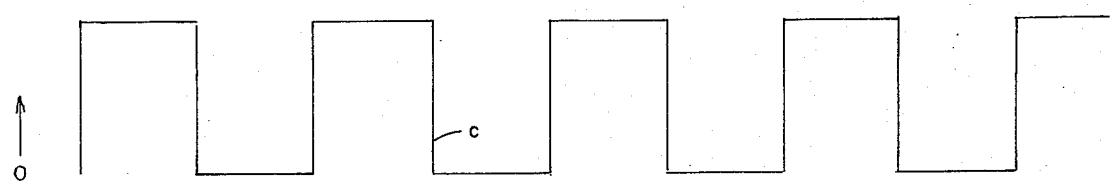
Figure 2:
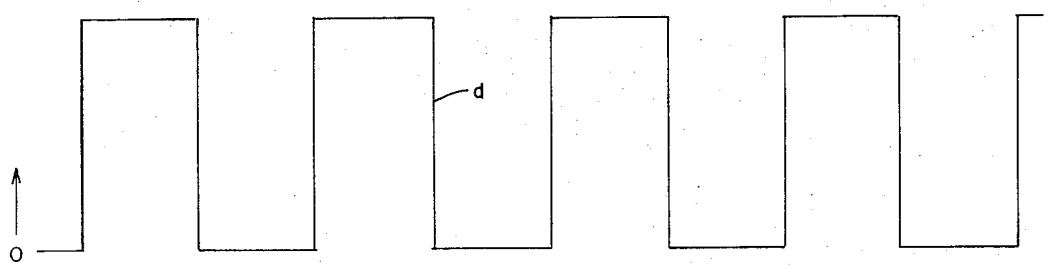
Figure 2:
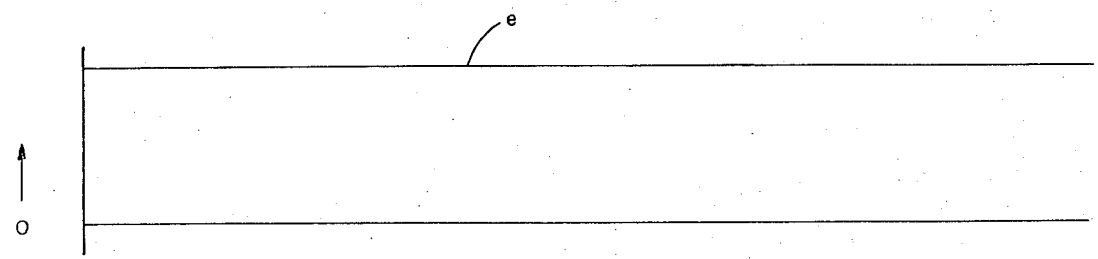

An input signal representing the actual parameter and having a frequency or pulse repetition rate proportional thereto is generated in a sensing device 10 and then applied to a Schmitt trigger 12. In this case the input signal is a sine wave $a$ as shown in FIG. 2, and the Schmitt trigger produces a short duration pulse on the occurrence of each positive going zero crossing of the input signal.

The Schmitt trigger 12 comprises a first transistor 14 having a grounded emitter 16, a collector 18 connected to the battery supply terminal 20 through a resistor 22, and a base 24. The input signal is applied to the base 24 through a resistor 26. A diode 27, connected between the emitter 16 and base 24, provides for operation of the Schmitt trigger on the positive half cycles. The Schmitt trigger includes a second transistor 28 having a grounded emitter 30, a collector 32 connected to the battery terminal 20 through resistors 34 and 36, and a base 37.

The voltage developed at the collector 18 of transistor 14 is coupled to the base 27 of transistor 28 through a resistor 38. The inherent distributed capacitance across resistor 38 provides a short time constant for the trigger. The voltage developed at the collector 32 of transistor 28 is fed back to the base 24 of transistor 14 through resistor 32 and a resistor 40.

The output from the Schmitt trigger 12, a short duration negative going pulse $b$, is applied through a capacitor 42 in a one-shot multivibrator circuit 50 to an operational amplifier 44. The negative input terminal of operational amplifier 44 is biased by means of a voltage divider comprising resistor 45 connected in parallel with a zener diode 46 and a resistor 47, the junction of resistor 47 and zener diode 46 being connected to the battery supply terminal 20 through a resistor 48. This arrangement biases the negative input terminal slightly positive. The positive terminal of operational amplifier 44 is connected to ground through a variable resistor R1. The output from the operational amplifier 44 is applied through a diode 51 and a resistor 52 across a clamping zener diode 53 and across the collector 54 and emitter 56 of a transistor 57. The base 58 of transistor 57 is connected to the output terminal of amplifier 44 through a resistor 60. The voltage across the zener diode 53 is fed back to the positive input terminal of the operational amplifier 44 through a capacitor C1 and the resistor R1.

The operational amplifier 44 and its associated circuitry produces a square wave $c$ having a fixed height, but a variable width. The width of the square wave is a function of the time constant formed by the combination of variable resistor R1 and capacitor C1. In practice, the resistor R1 was a pressure transducer connected so that a decreasing pressure linearly produced a proportional increase in resistance. This arrangement resulted in an area ratio for the pulse width in proportion to $1/\lambda$. As noted, the negative input terminal of amplifier 44 is held slightly positive by the voltage across the divider network (45, 46 and 47), and therefore the transistor 56 is conducting. The negative pulse from the Schmitt trigger 12 causes the output of amplifier 44 to go to positive saturation, which is clamped by the zener diode 53. At the same time, the voltage appears across C1 at the junction of C1 and R1 and the transistor 56, because of the positive voltage on the base, turns off allowing a positive voltage of fixed magnitude to be maintained across the zener diode 53.

The capacitor C1 now discharges through the resistor R1. When the voltage at the junction of R1 and C1 decays to a value lower than the negative input terminal, the amplifier output returns to zero, which turns transistor 56 on (conductive) and this produces a steeper trailing edge of the pulse $b$. This process is repeated every time the negative pulse $b$ is applied at the negative input terminal of amplifier 44.

Figure 1:
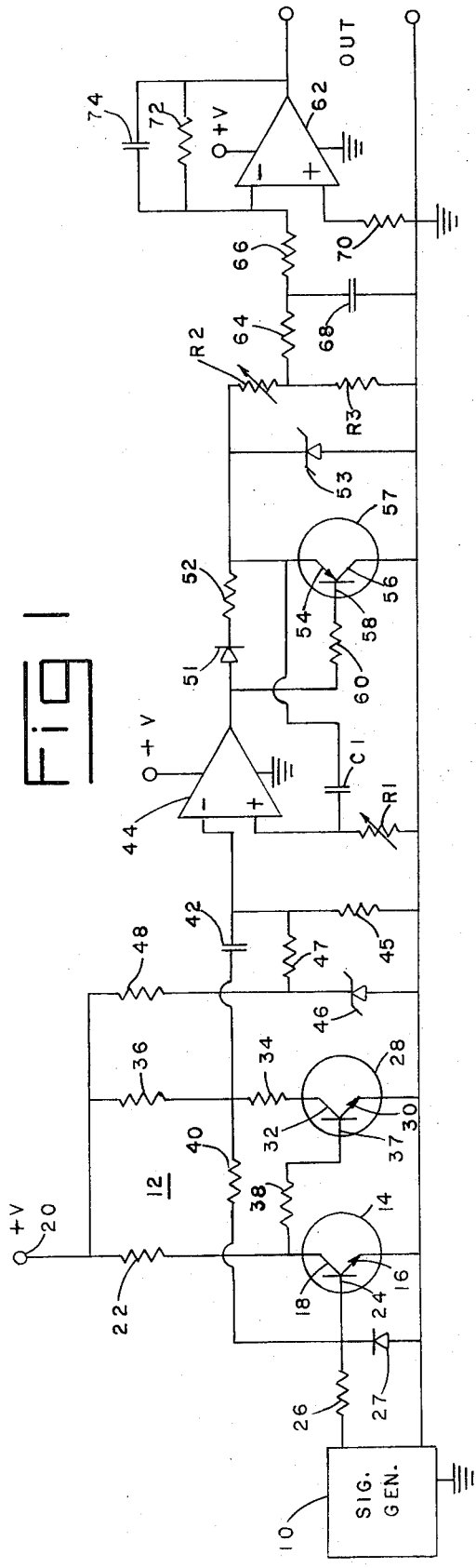
FIG. 1 is a schematic representation of a practical form of this invention.
Figure 3:
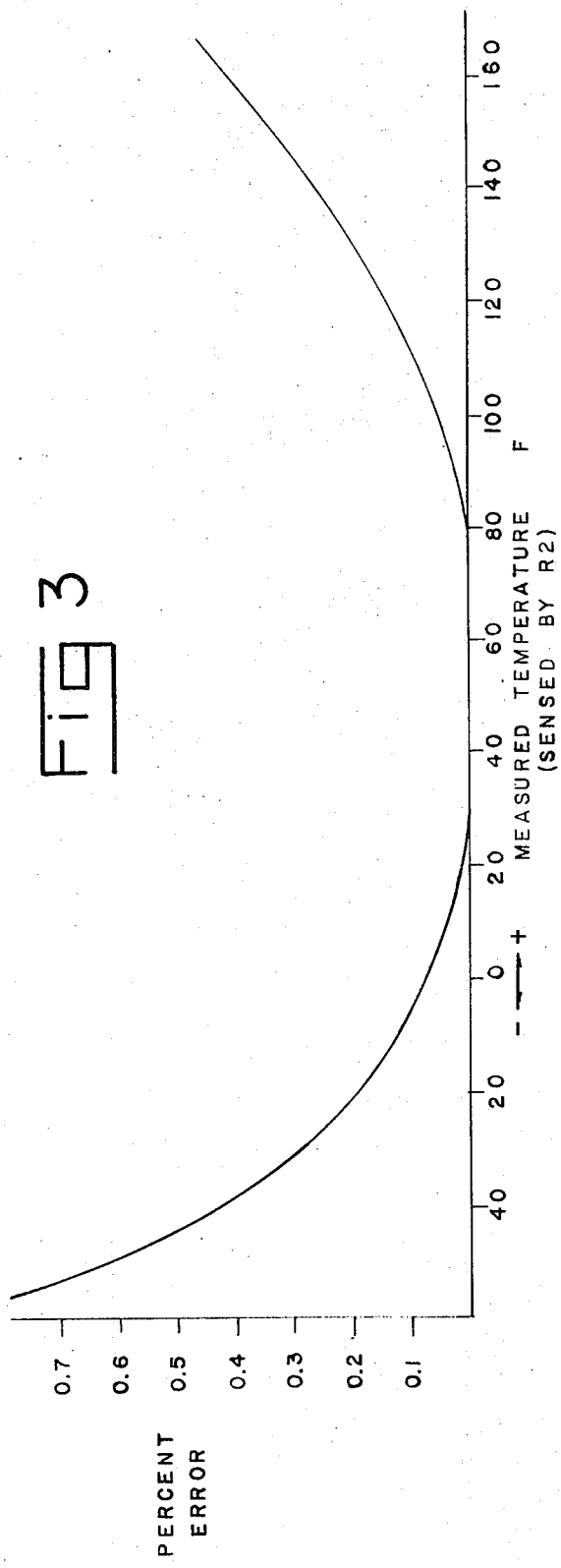
FIGS. 2 and 3 are curves illustrating the operation of FIG. 1.

The $1/\sqrt{\theta}$ function is developed by varying pulse height of wave $c$. This is accomplished by the combination of resistors R2 and R3 connected across point B and ground. Resistor R2 is variable and it represents a temperature sensing resistance thermometer. In the arrangement shown, the values are selected such that the ratio of R3/R2 + R3 provides unique non-linear relationship approximately proportional to $1/\sqrt{\theta}$. The accuracy of the approximation is shown in FIG. 3. Thus, the output voltage across resistor R3 varies in height as a function of the variation of resistor R2, and is shown in the curve $d$ in FIG. 2.

The following stage is an integrator comprised of an operational amplifier 62 having its negative input terminal supplied with the wave form of curve $d$ through resistors 64 and 66, a capacitor 68 being connected between the junction of resistors 64 and 66 and ground. The positive input terminal of operational amplifier 62 is connected to ground through a resistor 70. The feedback from the output terminal of the operational amplifier 62 to the negative input terminal is provided by means of the parallel connected resistor 72 and capacitor 74. The output from the integrator provides a D-C output proportional to the pulse area, which is a function of $X/\lambda \sqrt{\theta}$, where X is the measurand N, P or $W_f$. Curve $e$ represents the integrator output.

While the voltage divider comprising the resistors R2 and R3 does not provide an exact measure of the $\theta$ function, it does provide an approximation, as shown in FIG. 3, and it has a high degree of accuracy in the range of from approximately 30° to 80° F. At −50° the error increases to approximately 0.6 percent while at 160° the error increases to approximately 0.4 percent.

We claim:

1. In a system for referring a parameter of a gas turbine engine in accordance with the function $X/\lambda \sqrt{\theta}$, where X is such parameter and
$\lambda = P/29.92$ in. Hg.;
$\theta = 460 + T_A/518.4$;
P = ambient pressure; and
$T_A$ = ambient temperature,
the combination comprising:
means for generating a signal having a pulse repetition frequency proportional to such parameter;
square wave generating means responsive to said signal for generating a square wave of fixed height;
means responsive to pressure for varying the width of said square wave approximately in accordance with the function P/29.92; and
means responsive to temperature for varying the height of said square wave approximately in accordance with the function $460 + T_A/518.4$.

2. The invention as defined in claim 1 wherein said square wave generating means is a one-shot multivibrator and which includes a zener diode connected in the output thereof, said zener diode clamping the height of said square wave to the zener breakdown characteristics of said diode.

3. The invention as defined in claim 2 wherein said square wave generating means includes a resistance capacitance timing network for determining the duration of said square wave and wherein said means responsive to pressure is a variable in said network, said variable being responsive to ambient pressure in accordance with the function $1/\lambda$.

4. The invention as defined in claim 3 wherein a voltage divider is connected across said zener diode, said voltage divider including a variable impedance, said variable impedance being responsive to ambient temperature for varying the height of said square wave output in accordance with the function $1/\sqrt{\theta}$.

5. The invention as defined in claim 4, and an integrator connected across the fixed impedance of said voltage divider.

6. The invention as defined in claim 5 wherein said parameter is actual power.

7. The invention as defined in claim 5 wherein said parameter is actual fuel flow.

8. The invention as defined in claim 5 wherein said parameter is actual speed.

9. The invention as defined in claim 1 wherein said square wave generating means comprises an operational amplifier having first and second input terminals and an output terminal; a normally conductive transistor having an emitter electrode, a collector electrode and a base electrode, said base electrode being connected to said output terminal through a first resistor, said collector electrode being connected to said output electrode through a diode and a second resistor, said collector electrode being connected to a point of reference potential, a variable R-C network comprising a third resistor and a capacitor connected between said emitter electrode and said point of reference potential, the junction of said resistor and capacitor being connected to said second input terminal, said signal being applied to said first input terminal.

10. The invention as defined in claim 9 wherein a zener diode is connected across the collector and emitter electrodes of said transistor.

11. The invention as defined in claim 10 wherein said third resistor is variable as a function of pressure for varying the width of said square wave.

12. The invention as defined in claim 11 wherein a variable impedance voltage divider is connected across said zener diode.

13. The invention as defined in claim 12 wherein said signal is generated by a Schmitt trigger for producing a short duration pulse, said short duration pulse being applied to said first input terminal of said operational amplifier.

\* \* \* \* \*

PO-1050
(5/69)

UNITED STATES PATENT OFFICE
CERTIFICATE OF CORRECTION

Patent No. 3,829,666    Dated August 13, 1974

Inventor(s) Rudolph Hohenberg and Alan R. Duly

It is certified that error appears in the above-identified patent and that said Letters Patent are hereby corrected as shown below:

Column 1, line 12, "and" should read --- are ---.

Signed and sealed this 29th day of October 1974.

(SEAL)
Attest:

McCOY M. GIBSON JR.
Attesting Officer

C. MARSHALL DANN
Commissioner of Patents